United States Patent
Jiang et al.

(10) Patent No.: US 11,937,250 B2
(45) Date of Patent: Mar. 19, 2024

(54) METHOD FOR CONFIGURING PHYSICAL DOWNLINK CONTROL CHANNEL, USER EQUIPMENT AND NETWORK SIDE DEVICE

(71) Applicant: VIVO MOBILE COMMUNICATION CO., LTD., Chang'an Dongguan (CN)

(72) Inventors: Dajie Jiang, Chang'an Dongguan (CN); Xueming Pan, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 215 days.

(21) Appl. No.: 17/035,116

(22) Filed: Sep. 28, 2020

(65) Prior Publication Data

US 2021/0014885 A1 Jan. 14, 2021

Related U.S. Application Data

(63) Continuation of application No. PCT/CN2019/077790, filed on Mar. 12, 2019.

(30) Foreign Application Priority Data

Mar. 28, 2018 (CN) .......................... 201810265749.7

(51) Int. Cl.
*H04W 72/23* (2023.01)
(52) U.S. Cl.
CPC .................................. *H04W 72/23* (2023.01)

(58) Field of Classification Search
None
See application file for complete search history.

(56) References Cited

U.S. PATENT DOCUMENTS

| 2014/0126487 | A1* | 5/2014 | Chen | H04W 72/02 370/329 |
|---|---|---|---|---|
| 2015/0223210 | A1 | 8/2015 | Guo et al. | |
| 2016/0374141 | A1 | 12/2016 | He et al. | |
| 2017/0094643 | A1 | 3/2017 | Park et al. | |
| 2017/0264417 | A1* | 9/2017 | Eriksson | H04L 5/0053 |
| 2017/0310434 | A1 | 10/2017 | Harada et al. | |

(Continued)

FOREIGN PATENT DOCUMENTS

| CN | 101998429 A | 3/2011 |
|---|---|---|
| CN | 102469048 A | 5/2012 |

(Continued)

OTHER PUBLICATIONS

Extended European Search Report for related Application No. 19776447.5, dated Mar. 9, 2021.

(Continued)

*Primary Examiner* — Jenkey Van
(74) *Attorney, Agent, or Firm* — von Briesen & Roper, s.c.

(57) ABSTRACT

Provided are a method for configuring a physical downlink control channel, a user equipment and a network side device. The method comprises: receiving physical layer signaling or media access control (MAC) layer signaling sent by the network side; and determining, according to the physical layer or MAC layer signaling, a first parameter related to a PDCCH monitoring behavior of a serving cell.

12 Claims, 6 Drawing Sheets

(56) References Cited

U.S. PATENT DOCUMENTS

| | | | |
|---|---|---|---|
| 2019/0150183 A1* | 5/2019 | Aiba | H04W 24/10 370/336 |
| 2019/0158205 A1* | 5/2019 | Sheng | H04L 5/0048 |
| 2019/0253308 A1* | 8/2019 | Huang | H04W 72/046 |
| 2019/0254073 A1* | 8/2019 | Sheng | H04W 72/23 |
| 2019/0281481 A1 | 9/2019 | Shen | |
| 2020/0236699 A1* | 7/2020 | Nakashima | H04W 72/1289 |
| 2020/0374722 A1* | 11/2020 | Takeda | H04L 5/0053 |
| 2021/0045042 A1* | 2/2021 | Nakashima | H04W 76/27 |
| 2022/0210866 A1* | 6/2022 | He | H04W 76/28 |
| 2023/0309105 A1* | 9/2023 | Yi | H04W 72/23 |

FOREIGN PATENT DOCUMENTS

| | | |
|---|---|---|
| CN | 103686772 A | 3/2014 |
| CN | 103716823 A | 4/2014 |
| CN | 103906244 A | 7/2014 |
| CN | 104936206 A | 9/2015 |
| CN | 106454901 A | 2/2017 |
| CN | 106559161 A | 4/2017 |
| CN | 107404365 A | 11/2017 |
| EP | 3566381 A1 * | 11/2019 ........... H04B 7/0456 |
| WO | 2011038696 A1 | 4/2011 |

OTHER PUBLICATIONS

3rd Generation Partnership Project, "Random access procedure", Sep. 2017, 3GPP TS 36.213 V14.4.0.

Vivo, "Remaining details on NR-PDCCH search space", Nov. 27-Dec. 1, 2017, 3GPP TSG RAN WG1 Meeting 91, Reno, USA.

Indian Office Action related to Application No. 202027046676, dated Dec. 8, 2021.

International Search Report & Written Opinion related to Application No. PCT/CN2019/077790, dated Oct. 8, 2020.

Chinese Office Action for related Chinese Application No. 201810265749.7, dated May 8, 2020.

Intel Corporation, "CORESETs for NR PDCCH", May 15-19, 2017, 3GPP TSG RAN WG1 #89, Hangzhou, P.R. China.

* cited by examiner

METHOD FOR CONFIGURING PHYSICAL DOWNLINK CONTROL CHANNEL, USER EQUIPMENT AND NETWORK SIDE DEVICE

CROSS-REFERENCE TO RELATED APPLICATIONS

This patent application is a bypass continuation under 35 U.S.C. § 111 of PCT Application No. PCT/CN2019/077790 filed on Mar. 12, 2019, which claims priority to Chinese Patent Application No. 201810265749.7 filed in China on Mar. 28, 2018, disclosure of which are incorporated herein by reference in their entirety.

TECHNICAL FIELD

Embodiments of the present disclosure relate to the field of communications technologies, and in particular, to a method for configuring a physical downlink control channel (PDCCH), user equipment, and a network side device.

BACKGROUND

In a new radio (NR) system, different monitoring periods can be configured for different PDCCH search spaces (SS), and configurable monitoring periods include one slot, two slots, four slots, five slots, eight slots, ten slots, sixteen slots, and twenty slots. Services of user equipment (UE) are random. For example, at some moments, there are many downlink services, and downlink data packets also arrive frequently. In this case, the UE needs to frequently monitor a PDCCH on which downlink scheduling (scheduling of a PDSCH) is performed, to receive the downlink data packets. Because there is less uplink data or uplink feedback, relatively few PDCCHs on which uplink scheduling (scheduling of physical uplink shared channels (PUSCH)) is performed are monitored. At some other moments, there may be many uplink services, and uplink data packets also arrive frequently. In this case, the UE needs to frequently monitor a PDCCH on which uplink scheduling (scheduling of a PUSCH) is performed, to receive the uplink data packets. Because there is less downlink data or downlink feedback, relatively few PDCCHs on which downlink scheduling is performed are monitored.

Currently, in the 3rd Generation Partnership Project (3GPP) New Radio (NR) release 15 (R15) protocol, different downlink control information (DCI) formats (for example, a DCI format 0_1 and a DCI format 1_1) are configured with a same monitoring period. If the configured monitoring period is ten slots, the UE needs to monitor the DCI format 0_1 and the DCI format 1_1 every ten slots. Similarly, different control channel element (CCE) aggregation levels (AL) are configured with a same monitoring period, and therefore the UE monitors unnecessary DCI formats or CCE aggregation levels.

In addition, in the 3GPP NR release 15, a control resource set (CORESET) of a PDCCH to be monitored by the user equipment, a search space of the to-be-monitored PDCCH, a DCI format in the search space of the to-be-monitored PDCCH, a CCE aggregation level in the search space of the to-be-monitored PDCCH, an association relationship between the search space of the to-be-monitored PDCCH and the CORESET of the to-be-monitored PDCCH, and the like, are configured by using RRC signaling. A latency of the RRC signaling is relatively high, and the RRC signaling only supports a semi-static change in the above configuration parameters, and cannot quickly change the above configuration parameters.

SUMMARY

According to a first aspect, a method for monitoring a physical downlink control channel (PDCCH) is provided, and the method is applied to user equipment and includes:
  receiving physical layer signaling or media access control (MAC) layer signaling sent by a network side; and
  determining, based on the physical layer signaling or the MAC layer signaling, a first parameter related to a PDCCH monitoring behavior of a serving cell, where the first parameter includes at least one of the following:
  a control resource set (CORESET) of a to-be-monitored PDCCH;
  a search space of the to-be-monitored PDCCH;
  a DCI format in the search space of the to-be-monitored PDCCH;
  a CCE aggregation level in the search space of the to-be-monitored PDCCH; and
  an association relationship between the search space of the to-be-monitored PDCCH and the CORESET of the to-be-monitored PDCCH.

According to a second aspect, a method for monitoring a physical downlink control channel (PDCCH) is further provided, and the method is applied to user equipment and includes:
  receiving RRC signaling sent by a network side; and
  determining a monitoring parameter based on the RRC signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

According to a third aspect, a method for configuring a physical downlink control channel (PDCCH) is further provided, and the method is applied to a network side device and includes:
  sending physical layer signaling or media access control (MAC) layer signaling to user equipment, where the physical layer signaling or the media access control (MAC) layer signaling is used by the user equipment to determine a first parameter related to a PDCCH monitoring behavior of a serving cell, and the first parameter includes at least one of the following:
  a control resource set (CORESET) of a to-be-monitored PDCCH;
  a search space of the to-be-monitored PDCCH;
  a DCI format in the search space of the to-be-monitored PDCCH;
  a CCE aggregation level in the search space of the to-be-monitored PDCCH; and
  an association relationship between the search space of the to-be-monitored PDCCH and the CORESET of the to-be-monitored PDCCH.

According to a fourth aspect, a method for configuring a physical downlink control channel (PDCCH) is further provided, and the method is applied to a network side device and includes:
  sending RRC signaling to user equipment, where the RRC signaling is used by the user equipment to determine a monitoring parameter, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

According to a fifth aspect, user equipment is further provided, including:
a first receiving module, configured to receive physical layer signaling or media access control (MAC) layer signaling sent by a network side; and
a first determining module, configured to determine, based on the physical layer signaling or the MAC layer signaling, a first parameter related to a PDCCH monitoring behavior of a serving cell, where the first parameter includes at least one of the following:
a control resource set (CORESET) of a to-be-monitored PDCCH;
a search space of the to-be-monitored PDCCH;
a DCI format in the search space of the to-be-monitored PDCCH;
a CCE aggregation level in the search space of the to-be-monitored PDCCH; and
an association relationship between the search space of the to-be-monitored PDCCH and the CORESET of the to-be-monitored PDCCH.

According to a sixth aspect, user equipment is further provided, including:
a third receiving module, configured to receive RRC signaling sent by a network side; and
a fourth determining module, configured to determine a monitoring parameter based on the RRC signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

According to a seventh aspect, a network side device is further provided, including:
a first sending module, configured to send physical layer signaling or media access control (MAC) layer signaling to user equipment, where the physical layer signaling or the media access control (MAC) layer signaling is used by the user equipment to determine a first parameter related to a PDCCH monitoring behavior of a serving cell, and the first parameter includes at least one of the following:
a control resource set (CORESET) of a to-be-monitored PDCCH;
a search space of the to-be-monitored PDCCH;
a DCI format in the search space of the to-be-monitored PDCCH;
a CCE aggregation level in the search space of the to-be-monitored PDCCH; and
an association relationship between the search space of the to-be-monitored PDCCH and the CORESET of the to-be-monitored PDCCH.

According to an eighth aspect, a network side device is further provided, including:
a third sending module, configured to send RRC signaling to user equipment, where the RRC signaling is used by the user equipment to determine a monitoring parameter, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

According to a ninth aspect, user equipment is further provided, including: a processor, a memory, and a computer program that is stored in the memory and configured to run on the processor, where the computer program, when executed by the processor, implements steps of the method for monitoring a PDCCH in the first aspect or the second aspect.

According to a tenth aspect, a network side device is further provided, including: a processor, a memory, and a computer program that is stored in the memory and configured to run on the processor, where the computer program, when executed by the processor, implements steps of the method for configuring a PDCCH in the third aspect or the fourth aspect.

According to an eleventh aspect, a computer readable storage medium is further provided, where the computer readable storage medium stores a computer program, and the computer program, when executed by a processor, implements steps of the method for monitoring or configuring a PDCCH in the first aspect, the second aspect, the third aspect, or the fourth aspect.

BRIEF DESCRIPTION OF DRAWINGS

It becomes clear for a person skilled in the art to learn various other advantages and benefits by reading detailed description of the following optional implementation manners. Accompanying drawings are merely used for showing the optional implementation manners, but not considered as a limitation on the present disclosure. In all accompanying drawings, a same reference symbol is used to indicate a same part. In the accompanying drawings.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more optional or having more advantages than another embodiment or design scheme. Exactly, use of the word such as "exemplary" or "example" is intended to present a concept in a specific manner.

Figure 1:
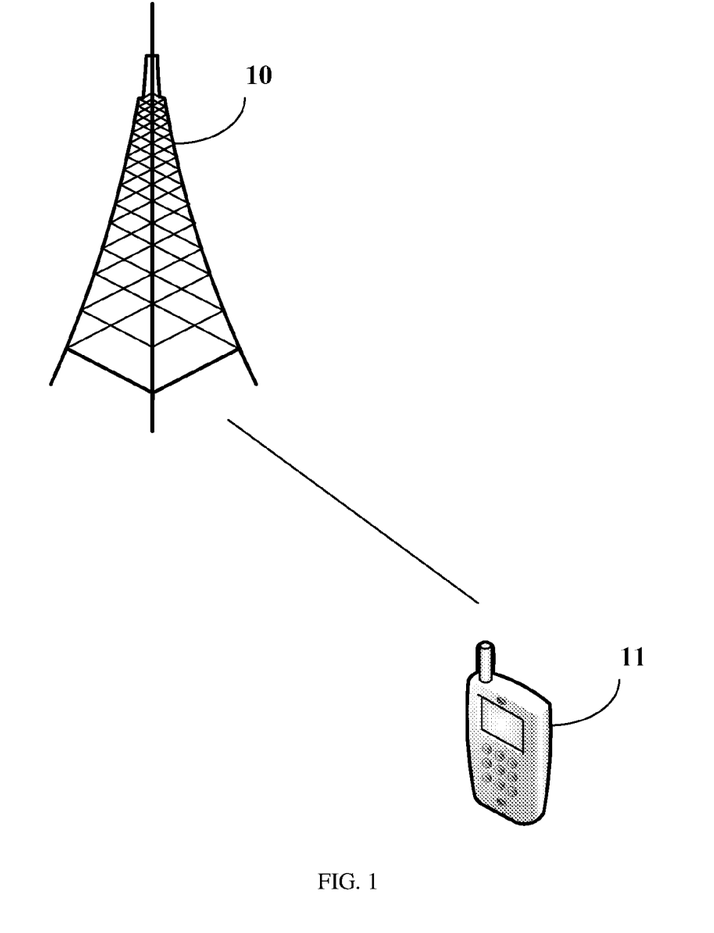
FIG. 1 is a schematic structural diagram of a wireless communications system according to an embodiment of the present disclosure.

The following describes the embodiments of this disclosure with reference to the accompanying drawings. A method for configuring a physical downlink control channel, user equipment, and a network side device provided in the embodiments of the present disclosure may be applied to a wireless communications system. The wireless communications system may be a 5G system, an evolved Long Term Evolution (eLTE) system, or a subsequent evolved communications system. FIG. 1 is a schematic structural diagram of a wireless communications system according to an embodiment of the present disclosure. As shown in FIG. 1, the wireless communications system may include a network side device 10 and user equipment. For example, the user equipment is denoted as UE 11, and the UE 11 may be connected to the network side device 10. In actual application, a connection between the devices is a wireless connection. For ease of visually indicating a connection relationship between the devices, solid lines are used for illustration in FIG. 1.

It should be noted that the above communications system may include a plurality of UEs, and the network side device may communicate with the plurality of UEs (transmit signaling or data).

The network side device 10 provided in this embodiment of the present disclosure may be a base station, and the base station may be a commonly used base station, or may be an evolved node base station (eNB), or may be a device such as a network side device in a 5G system (for example, a next generation node base station (gNB) or a transmission and reception point (TRP)).

The user equipment provided in this embodiment of the present disclosure may be a mobile phone, a tablet computer, a notebook computer, an ultra-mobile personal computer (UMPC), a netbook, a personal digital assistant (PDA), or the like.

Figure 2:
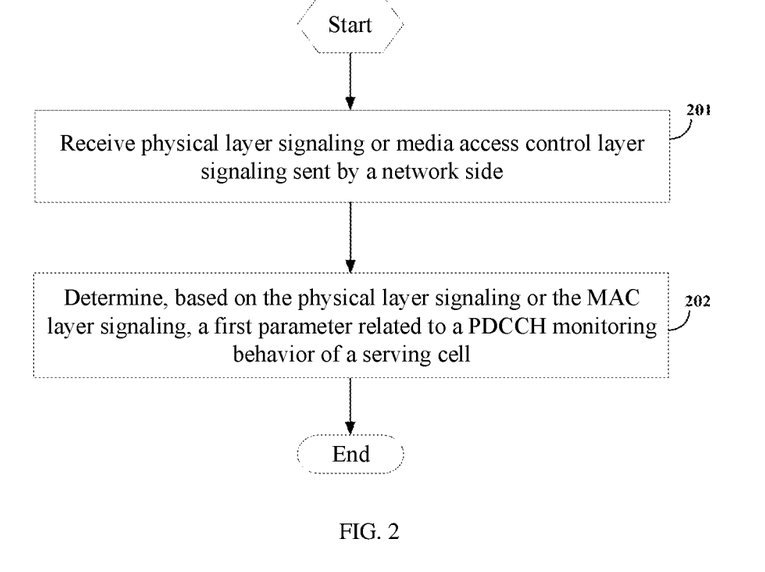
FIG. 2 is a first flowchart of a method for monitoring a PDCCH according to an embodiment of the present disclosure.

FIG. 2 shows a procedure of a method for monitoring a PDCCH according to an embodiment of the present disclosure. The method is performed by UE, and specific steps are as follows:

Step 201: Receive physical layer signaling or media access control (MAC) layer signaling sent by a network side.

Step 202: Determine, based on the physical layer signaling or the MAC layer signaling, a first parameter related to a PDCCH monitoring behavior of a serving cell.

The first parameter related to the PDCCH monitoring behavior of the serving cell includes at least one of the following:
  a control resource set (CORESET) of a to-be-monitored PDCCH;
  a search space of the to-be-monitored PDCCH;
  a DCI format in the search space of the to-be-monitored PDCCH;
  a CCE aggregation level in the search space of the to-be-monitored PDCCH; and
  an association relationship between the search space of the to-be-monitored PDCCH and the CORESET of a to-be-monitored PDCCH, where the association relationship indicates that the control resource set includes a plurality of search spaces, or which control resource set the search space belongs to.

In this embodiment of the present disclosure, the search space may be a common search space or a UE-specific search space.

In this way, the UE can dynamically disable or configure or reconfigure one or more search spaces or CORESETs by receiving a media access control control element or DCI, thereby avoiding unnecessary monitoring of a plurality of search spaces or CORESETs of different reception points by the UE when there are fewer services, thus reducing power consumption and improving efficiency. However, in the 3GPP R15 protocol, only semi-static configuration of a search space or CORESET through radio resource control (RRC) signaling is supported, but dynamic disabling or configuration or reconfiguration of one or more search spaces or CORESETs through receiving of a media access control control element or DCI is not supported.

In this embodiment of the present disclosure, optionally, before step 201 or step 202, or after step 201 or step 202, the method further includes:
  determining a monitoring parameter based on the physical layer signaling or the MAC layer signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH, for example, there is a one-to-one correspondence between the monitoring parameter and the at least one of the downlink control information (DCI) format of the PDCCH to be monitored by the user equipment, the control channel element (CCE) aggregation level of the to-be-monitored PDCCH, and the CCE aggregation level of the DCI format of the to-be-monitored PDCCH.

In this embodiment of the present disclosure, the UE may monitor the PDCCH based on the monitoring parameter. In this embodiment of the present disclosure, optionally, before step 201, the method further includes: receiving radio resource control (RRC) signaling sent by the network side; and determining, based on the RRC signaling, a second parameter related to the PDCCH monitoring behavior of the serving cell, where the second parameter includes at least one of the following: the control resource set (CORESET) of the to-be-monitored PDCCH; the search space of the to-be-monitored PDCCH; the DCI format in the search space of the to-be-monitored PDCCH; the CCE aggregation level in the search space of the to-be-monitored PDCCH; and the association relationship between the search space of the to-be-monitored PDCCH and the CORESET of the to-be-monitored PDCCH.

In this embodiment of the present disclosure, optionally, the DCI format includes at least one of the following:

a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a first DCI format and a second DCI format of a UE-specific search space (UE-Specific SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a third DCI format and a fourth DCI format of the UE-specific search space, where the third DCI format is used to schedule a physical uplink shared channel of a serving cell, for example, a DCI format 0_1 in R15, and the fourth DCI format is used to schedule a physical downlink shared channel of a serving cell, for example, a DCI format 1_1 in R15; and a first DCI format, a second DCI format, a third DCI format, and a fourth DCI format, where the first DCI format is used to schedule a physical uplink shared channel of a serving cell, for example, a DCI format 0_1 in R15, the second DCI format is used to schedule a physical downlink shared channel of a serving cell, for example, a DCI format 1_1 in R15, the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15.

If the DCI format in this embodiment of the present disclosure is the DCI format 0_1 and the DCI format 1_1 of the UE-specific search space, different monitoring parameters may be configured for the DCI format 0_1 and the DCI format 1_1. For example, at least one of monitoring periods, monitoring offsets, and monitoring patterns within a slot configured for the DCI format 0_1 and the DCI format 1_1 may be different.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot. In this way, at least one of monitoring periods, monitoring offsets, and monitoring patterns within a slot in monitoring parameters of different DCI formats is different, or at least one of monitoring periods, monitoring offsets, and monitoring patterns within a slot in monitoring parameters of different CCE aggregation levels is different.

In this embodiment of the present disclosure, a unit of the monitoring period may be a slot or a millisecond (ms), or the like. It should be noted that the slot in this specification may be a normal slot, for example, the normal slot includes fourteen time-domain symbols, or the slot may be a mini slot, and the mini slot includes less than fourteen time-domain symbols, for example, two, four, or seven time-domain symbols form one mini slot.

In this embodiment of the present disclosure, optionally, the CCE aggregation level includes at least one of the following: one CCE, two CCEs, four CCEs, eight CCEs, and sixteen CCEs. Certainly, the present disclosure is not limited thereto.

In this way, different DCI formats or CCE aggregation levels in a search space of a CORESET of a PDCCH are configured with different monitoring periods, thereby resolving a problem that the UE monitors unnecessary DCI formats or CCE aggregation levels because the different DCI formats or CCE aggregation levels are configured with a same monitoring period, thus reducing power consumption and improving efficiency.

Figure 3:
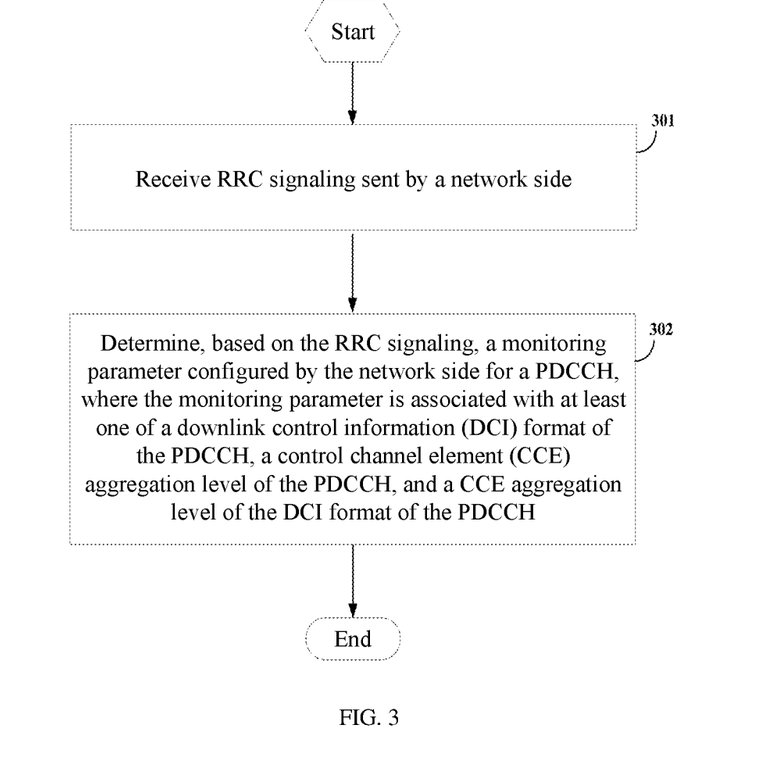
FIG. 3 is a second flowchart of a method for monitoring a PDCCH according to an embodiment of the present disclosure.

FIG. 3 shows a procedure of a method for monitoring a PDCCH according to an embodiment of the present disclosure. The method is performed by UE, and specific steps are as follows:

Step 301: Receive RRC signaling sent by a network side.

Step 302: Determine a monitoring parameter based on the RRC signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, the UE may monitor the PDCCH based on the monitoring parameter.

In this embodiment of the present disclosure, optionally, the DCI format includes at least one of the following:

a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a first DCI format and a second DCI format of a UE-Specific search space (UE-Specific SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a third DCI format and a fourth DCI format of the UE-specific search space, where the third DCI format is used to schedule a physical uplink shared channel of a serving cell, for example, a DCI format 0_1 in R15, and the fourth DCI format is used to schedule a physical downlink shared channel of a serving cell, for example, a DCI format 1_1 in R15; and a first DCI format, a second DCI format, a third DCI format, and a fourth DCI format, where the first DCI format is used to schedule a physical uplink shared channel of a serving cell, for example, a DCI format 0_1 in R15, the second DCI format is used to schedule a physical downlink shared channel of a serving cell, for example, a DCI format 1_1 in R15, the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15.

If the DCI format in this embodiment of the present disclosure is the DCI format 0_1 and the DCI format 1_1 of the UE-specific search space, different monitoring parameters may be configured for the DCI format 0_1 and the DCI format 1_1. For example, at least one of monitoring periods, monitoring offsets, and monitoring patterns within a slot configured for the DCI format 0_1 and the DCI format 1_1 may be different.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot. In this way, at least one of monitoring periods, monitoring offsets, and monitoring patterns within a slot in monitoring parameters of different DCI formats is different, or at least one of monitoring periods, monitoring offsets, and monitoring patterns within a slot in monitoring parameters of different CCE aggregation levels is different.

In this embodiment of the present disclosure, a unit of the monitoring period may be a slot or a millisecond (ms), or the like. It should be noted that the slot in this specification may be a normal slot, for example, the normal slot includes fourteen time-domain symbols, or the slot may be a mini slot, and the mini slot includes less than fourteen time-domain symbols, for example, two, four, or seven time-domain symbols form one mini slot.

In this embodiment of the present disclosure, optionally, the CCE aggregation level includes at least one of the following: one CCE, two CCEs, four CCEs, eight CCEs, and sixteen CCEs. Certainly, the present disclosure is not limited thereto.

In this way, different DCI formats or CCE aggregation levels in a search space of a CORESET of a PDCCH are configured with different monitoring parameters, thereby resolving a problem that the UE monitors unnecessary DCI formats or CCE aggregation levels because the different DCI formats or CCE aggregation levels are configured with a same monitoring period, thus reducing power consumption and improving efficiency.

For example, there is a one-to-one correspondence between a monitoring parameter and a CCE aggregation level of a search space. In a same slot, some search spaces are configured with only a low CCE aggregation level, for example, one CCE, two CCEs, or four CCEs, and some search spaces are configured with only a high CCE aggregation level, for example, eight CCEs or sixteen CCEs. If the UE is in a non-high-speed movement state for a period of time, a CCE aggregation level corresponding to the UE is relatively stable, and the UE can preferentially perform blind detection in a search space corresponding to the CCE aggregation level of the UE, thereby reducing a total quantity of blind detections.

Figure 4:
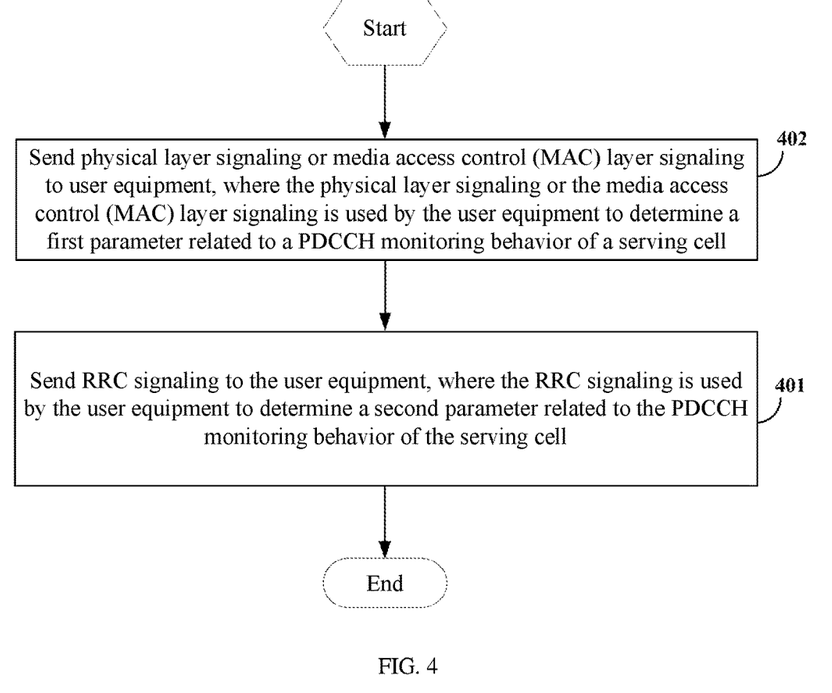
FIG. 4 is a first flowchart of a method for configuring a PDCCH according to an embodiment of the present disclosure.

FIG. 4 shows a procedure of a method for configuring a PDCCH according to an embodiment of the present disclosure. The method is performed by a network side device, and specific steps are as follows:

Step 401: Send physical layer signaling or media access control (MAC) layer signaling to user equipment, where the physical layer signaling or the media access control (MAC) layer signaling is used by the user equipment to determine a first parameter related to a PDCCH monitoring behavior of a serving cell.

The first parameter includes at least one of the following:
a control resource set (CORESET) of a to-be-monitored PDCCH;
a search space of the to-be-monitored PDCCH;
a DCI format in the search space of the to-be-monitored PDCCH;
a CCE aggregation level in the search space of the to-be-monitored PDCCH; and
an association relationship between the search space of the to-be-monitored PDCCH and the CORESET of the to-be-monitored PDCCH.

It should be noted that the physical layer signaling or the MAC layer signaling is further used by the UE to determine a monitoring parameter configured by a network side for the PDCCH, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, the search space may be a common search space or a UE-specific search space.

In this way, the UE can dynamically disable or configure one or more search spaces or CORESETs by receiving a media access control control element or DCI, thereby avoiding unnecessary monitoring of a plurality of search spaces or CORESETs of different reception points by the UE when there are fewer services, thus reducing power consumption and improving efficiency. However, in the 3GPP R15 protocol, only semi-static configuration of a search space or CORESET through RRC signaling is supported, but dynamic disabling or configuration of one or more search spaces or CORESETs through receiving of a media access control control element or DCI is not supported.

In this embodiment of the present disclosure, optionally, before step 401, the method further includes:

Step 402: Send RRC signaling to the user equipment, where the RRC signaling is used by the user equipment to determine a second parameter related to the PDCCH monitoring behavior of the serving cell, and the second parameter includes at least one of the following:
the control resource set (CORESET) of the to-be-monitored PDCCH;
the search space of the to-be-monitored PDCCH;
the DCI format in the search space of the to-be-monitored PDCCH;
the CCE aggregation level in the search space of the to-be-monitored PDCCH; and
the association relationship between the search space of the to-be-monitored PDCCH and the CORESET of the to-be-monitored PDCCH.

In this embodiment of the present disclosure, optionally, the DCI format includes at least one of the following:
a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;
a first DCI format and a second DCI format of a UE-specific search space (UE-Specific SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;
a third DCI format and a fourth DCI format of the UE-specific search space, where the third DCI format is used to schedule a physical uplink shared channel of a serving cell, for example, a DCI format 0_1 in R15, and the fourth DCI format is used to schedule a physical downlink shared channel of a serving cell, for example, a DCI format 1_1 in R15; and a first DCI format, a second DCI format, a third DCI format, and a fourth DCI format, where the first DCI format is used to schedule a physical uplink shared channel of a serving cell, for example, a DCI format 0_1 in R15, the second DCI format is used to schedule a physical downlink shared channel of a serving cell, for example, a DCI format 1_1 in R15, the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

In this way, different DCI formats or CCE aggregation levels in a search space of a CORESET of a PDCCH are configured with different monitoring parameters, thereby resolving a problem that the UE monitors unnecessary DCI formats or CCE aggregation levels because the different DCI formats or CCE aggregation levels are configured with a same monitoring period, thus reducing power consumption and improving efficiency.

Figure 5:
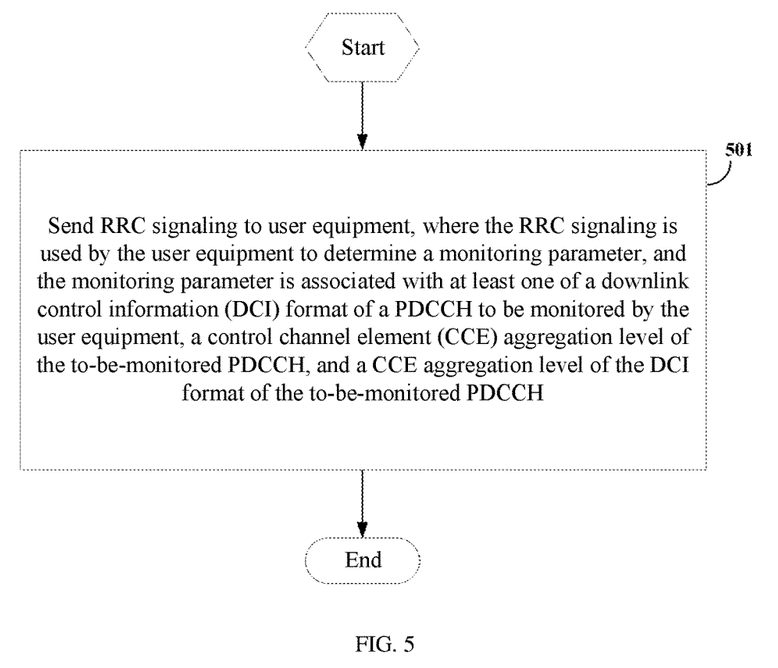
FIG. 5 is a second flowchart of a method for configuring a PDCCH according to an embodiment of the present disclosure.

FIG. 5 shows a procedure of a method for configuring a PDCCH according to an embodiment of the present disclosure. The method is performed by a network side device, and specific steps are as follows:

Step 501: Send RRC signaling to user equipment, where the RRC signaling is used by the user equipment to determine a monitoring parameter, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, optionally, the DCI format includes at least one of the following:

a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a first DCI format and a second DCI format of a UE-specific search space (UE-Specific SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a third DCI format and a fourth DCI format of the UE-specific search space, where the third DCI format is used to schedule a physical uplink shared channel of a serving cell, for example, a DCI format 0_1 in R15, and the fourth DCI format is used to schedule a physical downlink shared channel of a serving cell, for example, a DCI format 1_1 in R15; and a first DCI format, a second DCI format, a third DCI format, and a fourth DCI format, where the first DCI format is used to schedule a physical uplink shared channel of a serving cell, for example, a DCI format 0_1 in R15, the second DCI format is used to schedule a physical downlink shared channel of a serving cell, for example, a DCI format 1_1 in R15, the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

In this way, different DCI formats or CCE aggregation levels in a search space of a CORESET of a PDCCH are configured with different monitoring parameters, thereby resolving a problem that the UE monitors unnecessary DCI formats or CCE aggregation levels because the different DCI formats or CCE aggregation levels are configured with a same monitoring period, thus reducing power consumption and improving efficiency.

An embodiment of the present disclosure further provides user equipment. Because a problem-solving principle of the user equipment is similar to that of a method for monitoring a PDCCH in the embodiments of the present disclosure, reference may be made to implementation of the method for implementation of the user equipment, and no repeated description is provided.

Figure 6:
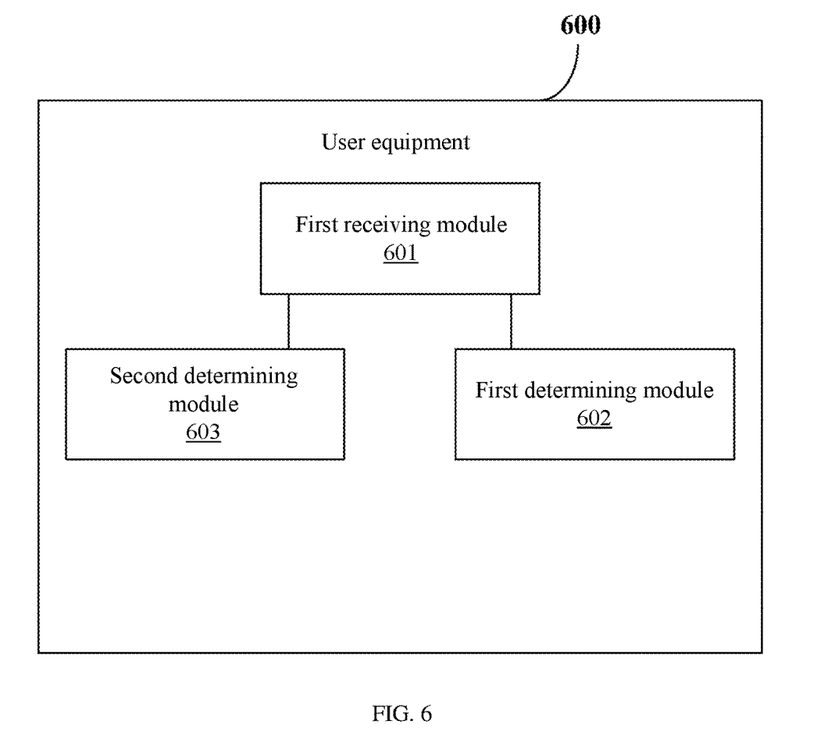
FIG. 6 is a first structural diagram of UE according to an embodiment of the present disclosure.

FIG. 6 shows a structure of user equipment 600, and the user equipment 600 includes:

a first receiving module 601, configured to receive physical layer signaling or media access control (MAC) layer signaling sent by a network side; and a first determining module 602, configured to determine, based on the physical layer signaling or the MAC layer signaling, a first parameter related to a PDCCH monitoring behavior of a serving cell, where the first parameter includes at least one of the following:

a control resource set (CORESET) of a to-be-monitored PDCCH;

a search space of the to-be-monitored PDCCH;

a DCI format in the search space of the to-be-monitored PDCCH;

a CCE aggregation level in the search space of the to-be-monitored PDCCH; and an association relationship between the search space of the to-be-monitored PDCCH and the CORESET of the to-be-monitored PDCCH.

In this embodiment of the present disclosure, optionally, the user equipment 600 further includes:

a second determining module 603, configured to determine a monitoring parameter based on the physical layer signaling or the MAC layer signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, optionally, the DCI format includes at least one of the following:

a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a first DCI format and a second DCI format of a UE-specific search space (UE-Specific SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a third DCI format and a fourth DCI format of the UE-specific search space, where the third DCI format is used to schedule a physical uplink shared channel of a serving cell, for example, a DCI format 0_1 in R15, and the fourth DCI format is used to schedule a physical downlink shared channel of a serving cell, for example, a DCI format 1_1 in R15; and a first DCI format, a second DCI format, a third DCI format, and a fourth DCI format, where the first DCI format is used to schedule a physical uplink shared channel of a serving cell, for example, a DCI format 0_1 in R15, the second DCI format is used to schedule a physical downlink shared channel of a serving cell, for example, a DCI format 1_1 in R15, the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

In this embodiment of the present disclosure, optionally, the user equipment further includes:

a second receiving module, configured to receive radio resource control (RRC) signaling sent by the network side; and a third determining module, configured to determine, based on the RRC signaling, a second parameter related to the PDCCH monitoring behavior of the serving cell, where the second parameter includes at least one of the following:

the control resource set (CORESET) of the to-be-monitored PDCCH;

the search space of the to-be-monitored PDCCH;

the DCI format in the search space of the to-be-monitored PDCCH;

the CCE aggregation level in the search space of the to-be-monitored PDCCH; and the association relationship between the search space of the to-be-monitored PDCCH and the CORESET of the to-be-monitored PDCCH.

Figure 7:
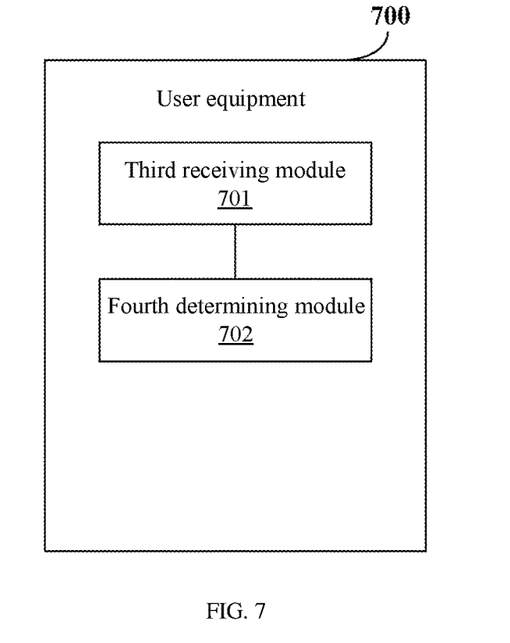
FIG. 7 is a second structural diagram of UE according to an embodiment of the present disclosure.

FIG. 7 shows a structure of user equipment 700, and the user equipment 700 includes:

a third receiving module 701, configured to receive RRC signaling sent by a network side; and a fourth determining module 702, configured to determine a monitoring parameter based on the RRC signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, optionally, the DCI formats includes at least one of the following:

a first DCI format and a second DCI format of a common search space (Common SS), where the first DCI format is used to schedule a physical uplink shared channel of a serving cell, for example, a DCI format 0_0 in R15, and the second DCI format is used to schedule a physical downlink shared channel of a serving cell, for example, a DCI format 1_0 in R15;

a third DCI format and a fourth DCI format of a UE-specific search space (UE-Specific SS), where the third DCI format is used to schedule a physical uplink shared channel of a serving cell, for example, a DCI format 0_0 in R15, and the fourth DCI format is used to schedule a physical downlink shared channel of a serving cell, for example, a DCI format 1_0 in R15;

a fifth DCI format and a sixth DCI format of the UE-specific search space, where the fifth DCI format is used to schedule a physical uplink shared channel of a serving cell, for example, a DCI format 0_1 in R15, and the sixth DCI format is used to schedule a physical downlink shared channel of a serving cell, for example, a DCI format 1_1 in R15; and a seventh DCI format, an eighth DCI format, a third ninth DCI format, and a tenth DCI format, where the seventh DCI format is used to schedule a physical uplink shared channel of a serving cell, for example, a DCI format 0_1 in R15, the eighth DCI format is used to schedule a physical downlink shared channel of a serving cell, for example, a DCI format 1_1 in R15, the ninth DCI format is used to schedule a physical uplink shared channel of a serving cell, for example, a DCI format 0_0 in R15, and the tenth DCI format is used to schedule a physical downlink shared channel of a serving cell, for example, a DCI format 1_0 in R15.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

The user equipment provided in this embodiment of the present disclosure may perform the foregoing method embodiment. An implementation principle and a technical effect of the user equipment are similar to those of the method embodiment, and details are not described again in this embodiment.

An embodiment of the present disclosure further provides a network side device. Because a problem-solving principle of the network side device is similar to that of a method for monitoring a PDCCH in the embodiments of the present disclosure, reference may be made to implementation of the method for implementation of the network side device, and no repeated description is provided.

Figure 8:
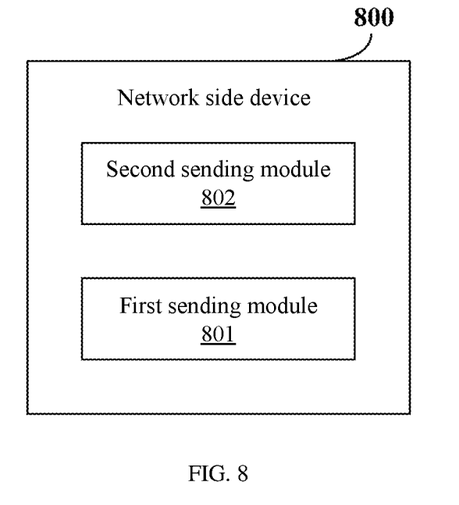
FIG. 8 is a first structural diagram of a network side device according to an embodiment of the present disclosure.

FIG. 8 shows a structure of a network side device 800, and the network side device 800 includes:

a first sending module 801, configured to send physical layer signaling or media access control (MAC) layer signaling to user equipment, where the physical layer signaling or the media access control (MAC) layer signaling is used by the user equipment to determine a first parameter related to a PDCCH monitoring behavior of a serving cell, and the first parameter includes at least one of the following:
a control resource set (CORESET) of a to-be-monitored PDCCH;
a search space of the to-be-monitored PDCCH;
a DCI format in the search space of the to-be-monitored PDCCH;
a CCE aggregation level in the search space of the to-be-monitored PDCCH; and
an association relationship between the search space of the to-be-monitored PDCCH and the CORESET of the to-be-monitored PDCCH.

In this embodiment of the present disclosure, optionally, the DCI formats includes at least one of the following:
a first DCI format and a second DCI format of a common search space, wherein the first DCI format is used to schedule a physical uplink shared channel of a serving cell, and the second DCI format is used to schedule a physical downlink shared channel of a serving cell;
a third DCI format and a fourth DCI format of a UE-specific search space, wherein the third DCI format is used to schedule a physical uplink shared channel of a serving cell, and the fourth DCI format is used to schedule a physical downlink shared channel of a serving cell;
a fifth DCI format and a sixth DCI format of the UE-specific search space, wherein the fifth DCI format is used to schedule a physical uplink shared channel of a serving cell, and the sixth DCI format is used to schedule a physical downlink shared channel of a serving cell; and
a seventh DCI format, an eighth DCI format, a ninth DCI format, and a tenth DCI format, wherein the seventh DCI format is used to schedule a physical uplink shared channel of a serving cell, the eighth DCI format is used to schedule a physical downlink shared channel of a serving cell, the ninth DCI format is used to schedule a physical uplink shared channel of a serving cell, and the tenth DCI format is used to schedule a physical downlink shared channel of a serving cell.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

Still referring to FIG. 8, the network side device 800 further includes:

a second sending module 802, configured to send RRC signaling to the user equipment, where the RRC signaling is used by the user equipment to determine a second parameter related to the PDCCH monitoring behavior of the serving cell, and the second parameter includes at least one of the following:
the control resource set (CORESET) of the to-be-monitored PDCCH;
the search space of the to-be-monitored PDCCH;
the DCI format in the search space of the to-be-monitored PDCCH;
the CCE aggregation level in the search space of the to-be-monitored PDCCH; and
the association relationship between the search space of the to-be-monitored PDCCH and the CORESET of the to-be-monitored PDCCH.

Figure 9:
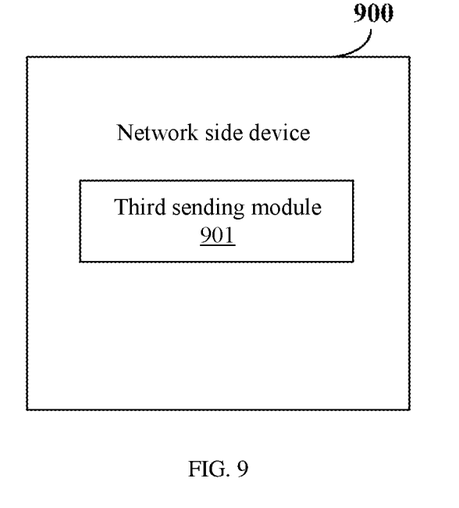
FIG. 9 is a second structural diagram of a network side device according to an embodiment of the present disclosure.

FIG. 9 shows a structure of a network side device 900, and the network side device 900 includes:

a third sending module 901, configured to send RRC signaling to user equipment, where the RRC signaling is used by the user equipment to determine a monitoring parameter, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In this embodiment of the present disclosure, optionally, the DCI format includes at least one of the following:
a first DCI format and a second DCI format of a common search space, where the first DCI format is used to schedule a physical uplink shared channel of a serving cell, and the second DCI format is used to schedule a physical downlink shared channel of a serving cell;
a first DCI format and a second DCI format of a UE-specific search space, where the first DCI format is used to schedule a physical uplink shared channel of a serving cell, and the second DCI format is used to schedule a physical downlink shared channel of a serving cell;
a third DCI format and a fourth DCI format of the UE-specific search space, where the third DCI format is used to schedule a physical uplink shared channel of a serving cell, and the fourth DCI format is used to schedule a physical downlink shared channel of a serving cell; and
a first DCI format, a second DCI format, a third DCI format, and a fourth DCI format, where the first DCI format is used to schedule a physical uplink shared channel of a serving cell, the second DCI format is used to schedule a physical downlink shared channel of a serving cell, the third DCI format is used to schedule a physical uplink shared channel of a serving cell, and the fourth DCI format is used to schedule a physical downlink shared channel of a serving cell.

In this embodiment of the present disclosure, optionally, the CCE aggregation level includes at least one of the following: one CCE, two CCEs, four CCEs, eight CCEs, and sixteen CCEs.

In this embodiment of the present disclosure, optionally, the monitoring parameter includes at least one of the following: a monitoring period, a monitoring offset, and a monitoring pattern within a slot, where the monitoring pattern within a slot is used to indicate one or more time-domain symbols in a CORESET for PDCCH monitoring in a slot.

The network side device provided in this embodiment of the present disclosure may perform the foregoing method embodiment. An implementation principle and a technical effect of the network side device are similar to those of the method embodiment, and details are not described again in this embodiment.

Figure 10:
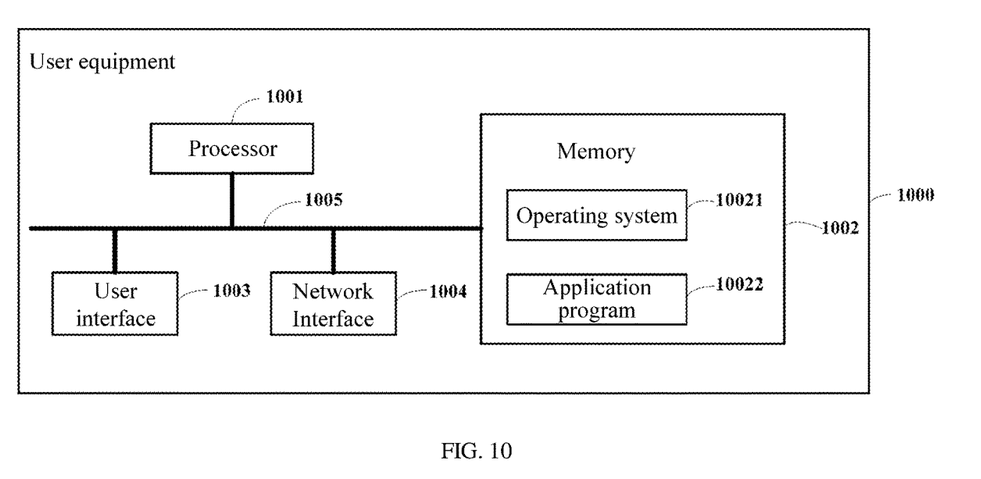
FIG. 10 is a third structural diagram of UE according to an embodiment of the present disclosure.

As shown in FIG. 10, user equipment 1000 shown in FIG. 10 includes: at least one processor 1001, a memory 1002, at least one network interface 1004, and a user interface 1003. All components of the user equipment 1000 are coupled by using the bus system 1005. It may be understood that the bus system 1005 is configured to implement a connection and communication between these components. In addition to a data bus, the bus system 1005 may include a power bus, a control bus, and a status signal bus. However, for clarity of description, various buses are marked as the bus system 1005 in FIG. 10.

The user interface 1003 may include a display, a keyboard, or a clicking device, for example, a mouse, a trackball, a touch panel, or a touchscreen.

It may be understood that the memory 1002 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct rambus random access memory (DRRAM). The memory 1002 in the system and the method that are described in this embodiment of the present disclosure is intended to include but is not limited to these memories and a memory of any other proper type.

In some implementations, the memory 1002 stores the following element: an executable module or a data structure, a subset of an executable module or a data structure, or an extended set of an executable module or a data structure: an operating system 10021 and an application program 10022.

The operating system 10021 includes various system programs, for example, a framework layer, a kernel library layer, and a driver layer, and is configured to implement various basic services and process hardware-based tasks. The application program 10022 includes various application programs, for example, a media player, and a browser, and is configured to implement various application services. A program for implementing the method in the embodiments of the present disclosure may be included in the application program 10022.

In this embodiment of the present disclosure, when a program or an instruction stored in the memory 1002 is invoked, that is, when a program or an instruction stored in the application program 10022 is executed, the following steps are implemented: receiving physical layer signaling or media access control (MAC) layer signaling sent by a network side; and determining, based on the physical layer signaling or the MAC layer signaling, a first parameter related to a PDCCH monitoring behavior of a serving cell, where the first parameter includes at least one of the following: a control resource set (CORESET) of a to-be-monitored PDCCH; a search space of the to-be-monitored PDCCH; a DCI format in the search space of the to-be-monitored PDCCH; a CCE aggregation level in the search space of the to-be-monitored PDCCH; and an association relationship between the search space of the to-be-monitored PDCCH and the CORESET of the to-be-monitored PDCCH.

Optionally, when the computer program is executed by the processor 1001, the following step may be further implemented: determining a monitoring parameter based on the physical layer signaling or the MAC layer signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In another embodiment of the present disclosure, when a program or an instruction stored in the memory 1002 is invoked, that is, when a program or an instruction stored in the application program 10022 is executed, the following steps are implemented: receiving RRC signaling sent by a network side; and determining a monitoring parameter based on the RRC signaling, where the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

The user equipment provided in this embodiment of the present disclosure may perform the foregoing method embodiment. An implementation principle and a technical effect of the user equipment are similar to those of the method embodiment, and details are not described again in this embodiment.

Figure 11:
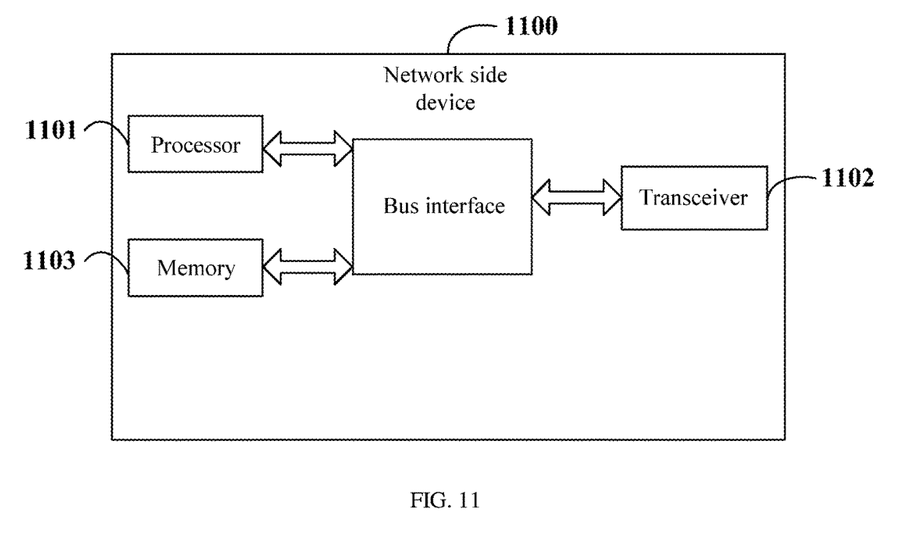
FIG. 11 is a third structural diagram of a network side device according to an embodiment of the present disclosure.

Referring to FIG. 11, an embodiment of the present disclosure provides another network side device 1100, including: a processor 1101, a transceiver 1102, a memory 1103, a user interface 1104, and a bus interface.

The processor 1101 may be responsible for managing the bus architecture and general processing. The memory 1103 may store data used by the processor 1101 when the processor 1101 performs an operation.

In this embodiment of the present disclosure, the network side device 1100 may further include a computer program that is stored in the memory 1103 and configured to run on the processor 1101, where the computer program, when executed by the processor 1101, implements the following step: sending physical layer signaling or media access control (MAC) layer signaling to user equipment, where the physical layer signaling or the media access control (MAC) layer signaling is used by the user equipment to determine a first parameter related to a PDCCH monitoring behavior of a serving cell, and the first parameter includes at least one of the following: a control resource set (CORESET) of a to-be-monitored PDCCH; a search space of the to-be-monitored PDCCH; a DCI format in the search space of the to-be-monitored PDCCH; a CCE aggregation level in the search space of the to-be-monitored PDCCH; and an association relationship between the search space of the to-be-monitored PDCCH and the CORESET of the to-be-monitored PDCCH.

Optionally, when the computer program is executed by the processor 1001, the following step may be further implemented: sending RRC signaling to the user equipment, where the RRC signaling is used by the user equipment to determine a parameter related to the PDCCH monitoring behavior of the serving cell, and the parameter includes at least one of the following: the control resource set (CORESET) of the to-be-monitored PDCCH; the search space of the to-be-monitored PDCCH; the DCI format in the search space of the to-be-monitored PDCCH; the CCE aggregation level in the search space of the to-be-monitored PDCCH; and the association relationship between the search space of the to-be-monitored PDCCH and the CORESET of the to-be-monitored PDCCH.

In another embodiment of the present disclosure, the network side device 1100 may further include: a computer program that is stored in the memory 1103 and configured to run on the processor 1101, where the computer program, when executed by the processor 1101, implements the following step: sending RRC signaling to user equipment, where the RRC signaling is used by the user equipment to determine a monitoring parameter, and the monitoring parameter is associated with at least one of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH.

In FIG. 11, a bus architecture may include any quantity of interconnected buses and bridges. Specifically, various circuits of one or more processors represented by the processor 1101 and a memory represented by the memory 1103 are interconnected. The bus architecture may further link various other circuits such as a peripheral device, a voltage regulator, and a power management circuit. These are well known in the art, and therefore are not further described in the embodiments of the present disclosure. A bus interface provides an interface. The transceiver 1102 may be a plurality of components. To be specific, the transceiver 1102 includes a transmitter and a receiver, and provides a unit configured to communicate with various other apparatuses on a transmission medium.

Method or algorithm steps described in combination with the content disclosed in the present disclosure may be implemented by hardware, or may be implemented by a processor by executing a software instruction. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, improvement, or the like made on a basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A method for monitoring a physical downlink control channel (PDCCH), applied to user equipment, comprising:
   receiving RRC signaling sent by a network side; and
   determining a monitoring parameter based on the RRC signaling, wherein the monitoring parameter is associated with at least two of a-downlink control information (DCI) formats of a PDCCH to be monitored by the user equipment, a control channel element (CCE) aggregation level of the to-be-monitored PDCCH, and a CCE aggregation level of the DCI formats of the to-be-monitored PDCCH;
   wherein the monitoring parameter comprises at least one of the following: a monitoring period, a monitoring offset, and a monitoring pattern within a slot, wherein the monitoring pattern within a slot is used to indicate one or more time-domain symbols in a CORESET for PDCCH monitoring in a slot, and at least one of the monitoring period, the monitoring offsets, and the monitoring pattern within a slot in monitoring parameter of different DCI formats is different;
   wherein the DCI formats comprises at least one of the following:
   a first DCI format and a second DCI format of a common search space, wherein the first DCI format is used to schedule a physical uplink shared channel of a serving cell, and the second DCI format is used to schedule a physical downlink shared channel of a serving cell;
   a third DCI format and a fourth DCI format of a UE-specific search space, wherein the third DCI format is used to schedule a physical uplink shared channel of a serving cell, and the fourth DCI format is used to schedule a physical downlink shared channel of a serving cell;
   a fifth DCI format and a sixth DCI format of the UE-specific search space, wherein the fifth DCI format is used to schedule a physical uplink shared channel of a serving cell, and the sixth DCI format is used to schedule a physical downlink shared channel of a serving cell; and
   a seventh DCI format, an eighth DCI format, a ninth DCI format, and a tenth DCI format, wherein the seventh DCI format is used to schedule a physical uplink shared channel of a serving cell, the eighth DCI format is used to schedule a physical downlink shared channel of a serving cell, the ninth DCI format is used to schedule a physical uplink shared channel of a serving cell, and the tenth DCI format is used to schedule a physical downlink shared channel of a serving cell;
   wherein, in a same slot, CCE aggregation levels configured in each search spaces are not identical;
   wherein the method further comprises:
   determining a search space which is used to perform blind detection based on a movement state of the UE, wherein the search space which is used to perform blind detection is corresponding to the CCE aggregation level of the UE; and
   dynamically disabling one or more search spaces or CORESETs by receiving DCI.

2. The method according to claim 1, wherein the CCE aggregation level comprises at least one of the following: one CCE, two CCEs, four CCEs, eight CCEs, and sixteen CCEs.

3. The method according to claim 1, wherein a unit of the monitoring period is a slot or a millisecond.

4. A method for configuring a physical downlink control channel (PDCCH), applied to a network side device, comprising:
   sending RRC signaling to user equipment, wherein the RRC signaling is used by the user equipment to determine a monitoring parameter, and the monitoring parameter is associated with at least two of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH;
   wherein the monitoring parameter comprises at least one of the following: a monitoring period, a monitoring offset, and a monitoring pattern within a slot, wherein the monitoring pattern within a slot is used to indicate one or more time-domain symbols in a CORESET for PDCCH monitoring in a slot, and at least one of the monitoring period, the monitoring offsets, and the monitoring pattern within a slot in monitoring parameter of different DCI formats is different;
   wherein the DCI format comprises at least one of the following:
   a first DCI format and a second DCI format of a common search space, wherein the first DCI format is used to schedule a physical uplink shared channel of a serving cell, and the second DCI format is used to schedule a physical downlink shared channel of a serving cell;
   a third DCI format and a fourth DCI format of a UE-specific search space, wherein the third DCI format is used to schedule a physical uplink shared channel of a serving cell, and the fourth DCI format is used to schedule a physical downlink shared channel of a serving cell;
   a third fifth DCI format and a sixth DCI format of the UE-specific search space, wherein the fifths DCI format is used to schedule a physical uplink shared channel of a serving cell, and the fourth sixth DCI format is used to schedule a physical downlink shared channel of a serving cell; and
   a seventh DCI format, an eighth DCI format, a ninth DCI format, and a tenth DCI format, wherein the seventh DCI format is used to schedule a physical uplink shared channel of a serving cell, the eighth DCI format is used to schedule a physical downlink shared channel of a serving cell, the ninth DCI format is used to schedule a physical uplink shared channel of a serving cell, and the tenth DCI format is used to schedule a physical downlink shared channel of a serving cell;
   wherein, in a same slot, CCE aggregation levels configured in each search spaces are not identical,
   and the CCE aggregation level is used to determine a search space which is used to perform blind detection, by the UE, based on a movement state of the UE, wherein the search space which is used to perform blind detection is corresponding to the CCE aggregation level of the UE;
   wherein the method further comprises:
   sending DCI to the user equipment to disable one or more search spaces or CORESETs dynamically.

5. The method according to claim 4, wherein the CCE aggregation level comprises at least one of the following: one CCE, two CCEs, four CCEs, eight CCEs, and sixteen CCEs.

6. User equipment, comprising: a processor, a memory, and a computer program that is stored in the memory and configured to run on the processor, wherein the computer program, when executed by the processor, implements following steps:

receiving RRC signaling sent by a network side; and determining a monitoring parameter based on the RRC signaling, wherein the monitoring parameter is associated with at least two of a downlink control information (DCI) format of a PDCCH to be monitored by the user equipment, a control channel element (CCE) aggregation level of the to-be-monitored PDCCH, and a CCE aggregation level of the DCI format of the to-be-monitored PDCCH;

wherein the monitoring parameter comprises at least one of the following: a monitoring period, a monitoring offset, and a monitoring pattern within a slot, wherein the monitoring pattern within a slot is used to indicate one or more time-domain symbols in a CORESET for PDCCH monitoring in a slot, and at least one of the monitoring period, the monitoring offsets, and the monitoring pattern within a slot in monitoring parameter of different DCI formats is different;

wherein the DCI format comprises at least one of the following:

a first DCI format and a second DCI format of a common search space, wherein the first DCI format is used to schedule a physical uplink shared channel of a serving cell, and the second DCI format is used to schedule a physical downlink shared channel of a serving cell;

a third DCI format and a fourth DCI format of a UE-specific search space, wherein the third DCI format is used to schedule a physical uplink shared channel of a serving cell, and the fourth DCI format is used to schedule a physical downlink shared channel of a serving cell;

a fifth DCI format and a sixth DCI format of the UE-specific search space, wherein the fifth DCI format is used to schedule a physical uplink shared channel of a serving cell, and the sixth DCI format is used to schedule a physical downlink shared channel of a serving cell; and a seventh DCI format, an eighth DCI format, a ninths DCI format, and a tenth DCI format, wherein the seventh DCI format is used to schedule a physical uplink shared channel of a serving cell, the eighth DCI format is used to schedule a physical downlink shared channel of a serving cell, the ninth DCI format is used to schedule a physical uplink shared channel of a serving cell, and the tenth DCI format is used to schedule a physical downlink shared channel of a serving cell;

wherein, in a same slot, CCE aggregation levels configured in each search spaces are not identical;

wherein the method further comprises:

determining a search space which is used to perform blind detection based on a movement state of the UE, wherein the search space which is used to perform blind detection is corresponding to the CCE aggregation level of the UE; and dynamically disabling one or more search spaces or CORESETs by receiving DCI.

7. The User equipment according to claim 6, wherein the CCE aggregation level comprises at least one of the following: one CCE, two CCEs, four CCEs, eight CCEs, and sixteen CCEs.

8. The User equipment according to claim 6, wherein a unit of the monitoring period is a slot or a millisecond.

9. A network side device, comprising: a processor, a memory, and a computer program that is stored in the memory and configured to run on the processor, wherein the computer program, when executed by the processor, implements steps of the method for configuring a PDCCH according to claim 4.

10. The network side device according to claim 9, wherein the CCE aggregation level comprises at least one of the following: one CCE, two CCEs, four CCEs, eight CCEs, and sixteen CCEs.

11. A non-transitory computer readable storage medium, wherein the non-transitory computer readable storage medium stores a computer program, and the computer program, when executed by a processor, implements steps of the method for monitoring a PDCCH according to claim 1.

12. A non-transitory computer readable storage medium, wherein the non-transitory computer readable storage medium stores a computer program, and the computer program, when executed by a processor, implements steps of the method for configuring a PDCCH according to claim 4.

* * * * *